Aug. 18, 1953
L. D. STRIPLING
2,649,175
FRICTION CLUTCH
Filed Jan. 19, 1951
2 Sheets-Sheet 1
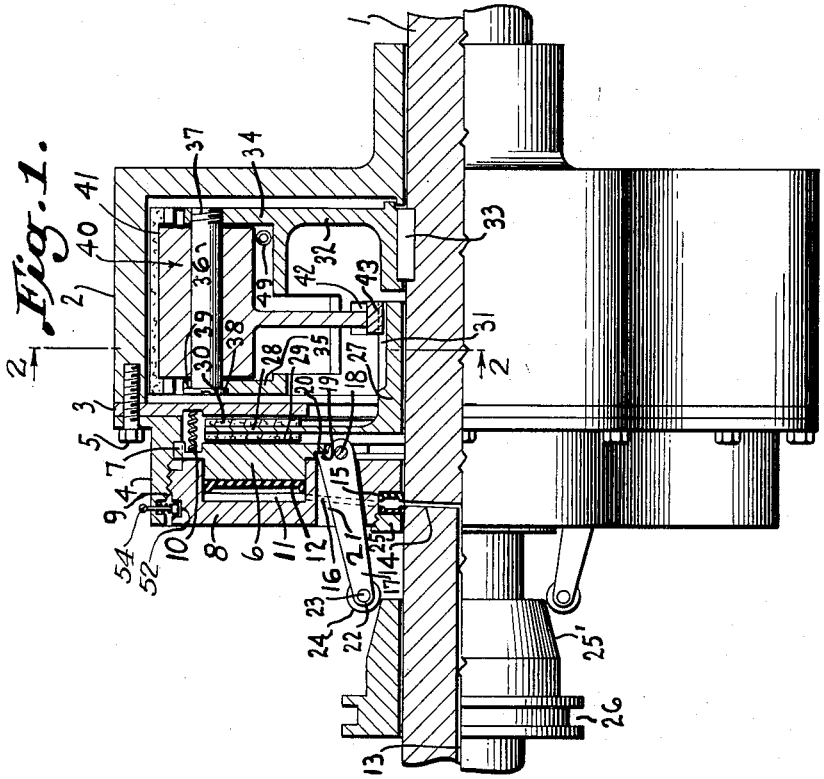
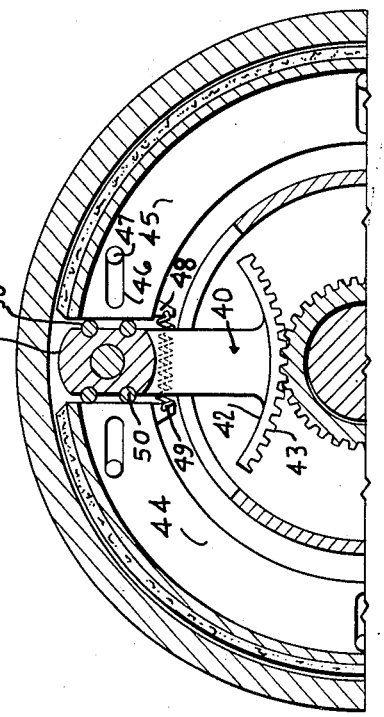
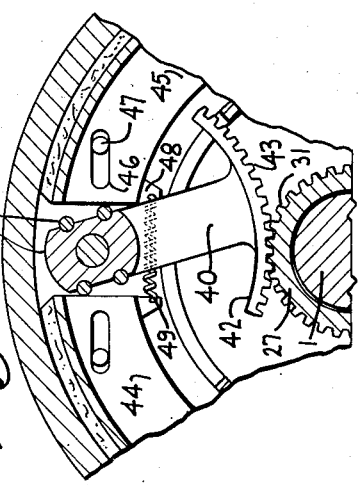
Leslie D. Stripling
INVENTOR.
BY Lester B. Clark
ATTORNEY Aug. 18, 1953  L. D. STRIPLING  2,649,175
FRICTION CLUTCH
Filed Jan. 19, 1951  2 Sheets-Sheet 2
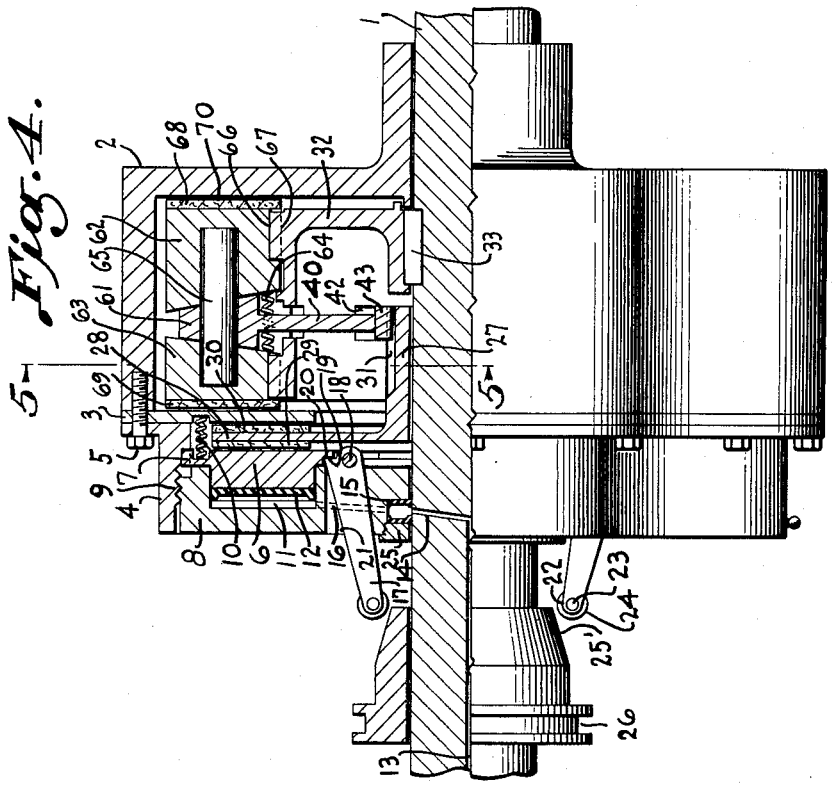
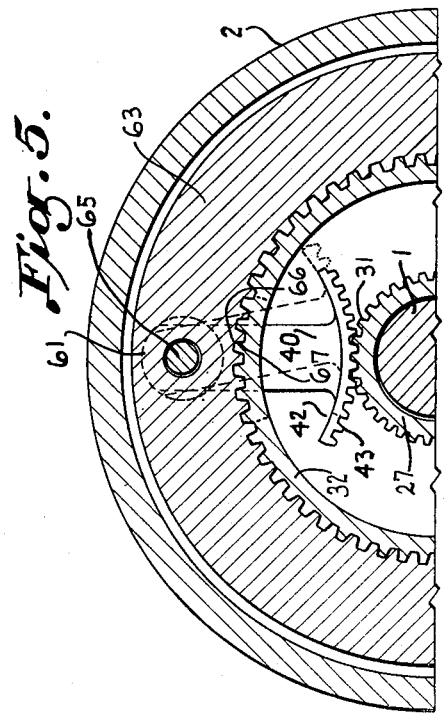
Leslie D. Stripling
INVENTOR.
BY Lester B. Clark
ATTORNEY Patented Aug. 18, 1953

2,649,175

UNITED STATES PATENT OFFICE 2,649,175

FRICTION CLUTCH

Leslie D. Stripling, Bay City, Tex.

Application January 19, 1951, Serial No. 206,809

6 Claims. (Cl. 192—35)

This invention relates to a friction clutch, such invention being an improvement over the friction clutch disclosed in my co-pending application Serial No. 65,367, filed December 15, 1948, and now Patent Number 2,609,902, issued September 9, 1952.

It is an object of this invention to provide an improved clutch of this character which is adapted to occupy a minimum amount of space while providing adequate power transmission capacity.

It is another object of this invention to provide a clutch of this class which is adapted to deliver the actuating force to place the clutch faces in engagement, in a most positive manner.

It is another object of this invention to provide a clutch of this class in which the clutching surface of the actuator and the clutching surface of the clutch itself are both totally enclosed.

It is still another object of this invention to provide a clutch of this class which may be actuated either manually or by a pressurized fluid, as by a pneumatic or hydraulic system.

It is still a further object of this invention to provide a clutch of this class having one modification adapted to move shoes radially into clutching engagement and having another modification adapted to move faced segments axially into clutching engagement.

It is yet a further object of this invention to provide a clutch of this class which is adapted to transmit the driving force from a driven housing to a drive shaft or from a driven shaft to a drive housing.

It is a still further object of this invention to provide an improved clutch having shoe mounting and cam pins of increased strength; a reduced number of parts; and an even clutching and releasing action.

Other and further objects will be apparent when the specification is considered in connection with the drawings in which:

Fig. 1 is an elevation, part in section, of one modification of my invention.

Fig. 2 is a transverse sectional view, taken along line 2—2 of Fig. 1.

Fig. 3 is a fragmentary sectional view, showing the brake lining of Fig. 2 moved into clutching contact with the drum housing.

Fig. 4 is an elevation, part in section, of another modification of my invention.

Fig. 5 is a transverse sectional view taken along line 5—5 of Fig. 4.

In the modification shown in Figs. 1-3, a shaft 1, which may be termed the drive shaft, has therearound the drum housing 2, which may be termed the driven housing.

The driving plate 3 and the drive ring 4 are successively connected to the housing 2 by means of the cap screws 5. The pressure plate 6 extends around the shaft 1 and fits within the drive ring 4 and is splined thereto at 7. The plate 8, which may be termed as the adjustment plate for purposes to be hereinafter described, is threaded at 9 into the drive ring 4. The spring 10 extends between the driving plate 3 and the pressure plate 6 and normally urges the pressure plate against the adjustment plate 8.

The adjustment plate 8 provides the cavity or space 11 to receive a fluid or to receive compressed air as the case may be. The packing 12 prevents the escape of air or fluid between the adjustment plate 8 and the pressure plate 6. The fluid or air is supplied to the space 11 through the axial passage 13 and the radial passage 14 in the shaft 1, the packing ring 15 therearound, and the passage 16.

The lever 17 is pivoted on the pin 18 which extends transversely of the shaft axis and which is mounted in the adjustment plate 8. The lever 17 has the projection 19 thereon to bear against the surface 20 of the pressure plate 6. This lever 17 extends through the opening 21 in the adjustment plate 8 and terminates outwardly at 22 in a supporting end for the pin 23 which has the roller 24 mounted thereon. Inwardly of the opening 21 the keeper ring 25 is threaded into the adjustment plate 8 to retain the packing ring 15 in place.

A conventional truncated cone element 25' is slidable on the shaft 1 and has the annular ring 26 thereon so that a clutch handle may be inserted therein to move the cone element axially along the shaft 1 and against the roller 24. This forces the projection 19 against the surface 20 and moves the pressure plate 6 to the right, as shown in Fig. 1.

Axially inwardly of the pressure plate 6 is provided the actuating plate means or assembly 27 which comprises the actuating plate 28 having the friction liner 29 and 30 on opposite sides thereof, and the hub 31 which has the pinion teeth therearound. This element or assembly is slidably mounted on shaft 1.

The carrier 32 is connected to rotate with the shaft 1 by the key 33. This carrier has the side walls 34 and 35 between which extends the pin 36 which is threaded at one end 37 to the wall 34 and which has the head 38 to seat within the counterbore 39. The arm 40 has the cam portion 41 through which extends the pin 36, and at the other end it has the rack segment 42 which has the teeth 43 therein to mesh with the pinion teeth of the hub 31.

The shoes 44 and 45 are mounted on the carrier 32 and are adapted to pull radially outward on the carrier with relation to the shaft axis by means of the slots 46, with axes extending perpendicularly to the shaft axis. The pins 47 extend into the shoe slots 46 from the carrier walls and serve as the guide elements for the shoes. Lugs 48 on the shoe ends adjacent the cam 41, are provided so that the spring 49 may be attached thereto to hold the shoe end in engagement with the roller 50 of the cam 41.

As the liners 29 and 28 become worn, adjustment can be made by threading the adjustment plate 8 inwardly in the drive ring 4. This adjustment plate 8 has a plurality of circumferentially spaced radial notches or holes 52 in its periphery, and after each adjustment the adjustment plate 8 can be locked in adjusted position by means of a spring pressed plunger or lock pin 54 which can be pulled upwardly beyond the plate periphery against its spring to permit the adjustment plate to be rotated, and then the lock pin 54 may be released to project back in one of the spaced notches 52. This adjustment resets the position of the pivot pin 18 as well as the pressure plate release position abutment stop.

In operation, in order to drive the housing 2 with the shaft 1, force may be applied to the cone element 25 to move it to the right, as shown in Fig. 1. This results in the pivoting of the projection 19 of the lever 17 in a clockwise direction against the surface 20 of the pressure plate 6 to force the pressure plate into frictional engagement with the liner 29 and to force the liner 30 of the actuating plate into frictional engagement with the driving plate 3 of the housing assembly 2. This frictional engagement binds the actuating plate means 27 against rotation, while the shaft 1 is free to rotate therein. Now, as the carrier 34 is keyed to the shaft 1 to rotate therewith, there results a certain amount of rotation of the carrier with relation to the actuating plate means 27.

The amount of the rotation of the arm 40 with relation to the shaft 1, is that amount sufficient, as shown in Fig. 3, to move the shoes 44 and 45 into positions where the pins 47 are substantially at the outer ends of the slots 46. This resulting radially outward movement of the shoes forces the liners 51 of the shoes into frictional contact with the inner periphery of the housing 2 with the result that the housing 2 and the shaft 1 now rotate together.

It is pointed out that whereby the shaft 1 is hereinabove referred to as the driving shaft, and whereas the housing 2 is described as the driven element, the reverse of this transmission can also be true. In other words the application of a rotative force to the housing 2, as at the hub thereof, can also result in the transmission working to operate to drive the shaft 1. The chain of transmission can thus be followed through from the driving housing 2 to the shoes 44 and 45, from the shoes to the carrier 32, and through the key 33 to the shaft 1.

In the modifications shown in Figs. 4 and 5 the structure of housing, drive ring, driving plate, adjustment plate, pressure plate, and actuating plate means, also the lever and the cone element, are the same as shown in Figs. 1–3. The difference in construction in other respects in this modification consists of the fact that the friction plate elements are mounted on the arm and carrier, and move axially outwardly with relation to the carrier and into frictional engagement with side wall 70 of the housing and the driving plate 3.

In this modification therefore the arm 40 has, in place of the cam 41, the cam 61, which has faces beveled upwardly and inwardly. Plate segments 62 and 63 bear against the cam faces on either side, and the tension spring 64 normally draws these segments into engagement with the cam surfaces. The pin 65 extends through the cam 61 and the segments 62 and 63 float thereon. The carrier 32 and the segments 62 and 63 are connected by the splines or gear teeth constructions 66 and 67 so that the segments 62 and 63 may move axially with relation to the carrier 32. The segments 62 and 63 have the liners 68 and 69 on the outer faces thereof to bear against the inner surface of the housing wall 70 and the driving plate 3. This type of clutch is best adapted for high speed usages as the centrifugal force developed in the shoe type clutch, when employed for such usages, is objectional.

This invention is not limited to the particular housing construction shown and it is possible to provide a housing assembly in which the housing 2, driving plate 3, and drive ring 4, may all be included in an integral casting. In such construction the other end of the housing would have to be an element threaded into the housing proper for purposes of access and assembly. The actuator means, as the lever and cone, or the air or fluid actuator means, and the adjustment plate 8, also are not limited to the specific constructions shown, but other constructions may serve as well as long as they permit movement of the pressure plate into frictional contact with the adjustment plate means.

Broadly, this invention considers a friction clutch in which the frictional engagement of an actuator means serves to set in motion rotative forces which act to move frictional elements axially or radially into driving engagement with the inner surface of the clutch housing.

What is claimed is:

1. In a clutch, the combination of, a shaft, a housing assembly including an inner annular surface driving plate, a pressure plate within said housing and around said shaft and adapted to slide axially with relation to said shaft and housing, actuating plate means around said shaft and including a hub having pinion teeth thereon, a shoe carrier member keyed to said shaft, pin means in said carrier and extending parallel to the axis of said shaft, arm means comprising rack segment means to mesh with said pinion teeth and including cam means through which said pin means passes, substantially circular shoe means mounted on said carrier and adapted to move radially of said shaft axis, and an actuator means adapted to move said pressure plate axially of said shaft and into frictional contact with said actuating plate means to force said actuating plate means against said driving plate so that said carrier may rotate with relation to said actuating plate means whereby said rack segment rotates in engagement with said pinion and said cam forces said shoe means outwardly from said cam to frictionally engage said inner housing surface to rotate said housing with said shaft.

2. In a clutch, the combination of, a shaft, a housing assembly including an inner annular surface driving plate, a pressure plate within said housing and around said shaft and adapted to slide axially with relation to said shaft and housing, actuating plate means around said shaft and including a hub having pinion teeth thereon, a shoe carrier member keyed to said shaft, pin means in said carrier and extending parallel to the axis of said shaft, arm means comprising rack segment means to mesh with said pinion teeth and including cam means through which said pin means passes, friction plate segment means mounted on said carrier and adapted to move axially of said shaft axis, and an actuator means adapted to move said pressure plate axially of said shaft and into frictional contact with said actuating plate means to force said actuating plate means against said driving plate so that said carrier may rotate with relation to said actuating plate means whereby said rack segment rotates in engagement with said pinion and said cam forces said friction plate segment means outwardly from said cam to frictionally engage said inner housing surface to rotate said housing with said shaft.

3. In a clutch, the combination of, a shaft, a housing assembly including an inner annular surface driving plate, a pressure plate within said housing and around said shaft and adapted to slide axially with relation to said shaft and housing, actuating plate means around said shaft and including a hub having pinion teeth thereon, a shoe carrier member keyed to said shaft, pin means in said carrier and extending parallel to the axis of said shaft, arm means comprising rack segment means to mesh with said pinion teeth and including cam means through which said pin means passes, frictional engagement means mounted on said carrier and adapted to move with relation thereto, and an actuator means adapted to move said pressure plate axially of said shaft and into frictional contact with said actuating plate means to force said actuating plate means against said driving plate so that said carrier may rotate with relation to said actuating plate means whereby said rack segment rotates in engagement with said pinion and said cam forces said frictional engagement means outwardly from said cam to frictionally engage said inner housing surface to rotate said housing with said shaft.

4. In a clutch, the combination of, a shaft, a housing assembly including an inner annular surface driving plate, a pressure plate within said housing and around said shaft and adapted to slide axially with relation to said shaft and housing, actuating plate means around said shaft and including a hub having pinion teeth thereon, a shoe carrier member keyed to said shaft, pin means in said carrier and extending parallel to the axis of said shaft, arm means comprising rack segment means to mesh with said pinion teeth and including cam means through which said pin means passes, frictional engagement means mounted on said carrier and adapted to move with relation thereto, and an actuator means including clutch engagement means manually slidable upon said shaft and adapted to move said pressure plate axially of said shaft and into frictional contact with said actuating plate means to force said actuating plate means against said driving plate so that said carrier may rotate with relation to said actuating plate means whereby said rack segment rotates in engagement with said pinion and said cam forces said frictional engagement means outwardly from said cam to frictionally engage said inner housing surface to rotate said housing with said shaft.

5. In a clutch, the combination of, a shaft, a housing assembly including an inner annular surface driving plate, a pressure plate within said housing and around said shaft and adapted to slide axially with relation to said shaft and housing, actuating plate means around said shaft and including a hub having pinion teeth thereon, a shoe carrier member keyed to said shaft, pin means in said carrier and extending parallel to the axis of said shaft, arm means comprising rack segment means to mesh with said pinion teeth and including cam means through which said pin means passes, frictional engagement means mounted on said carrier and adapted to move with relation thereto, and an actuator means including means adapted to provide an inclosed annular space outwardly of said pressure plate and adapted to supply pressure fluid to said pressure plate to move said pressure plate axially of said shaft and into frictional contact with said actuating plate means to force said actuating plate means against said driving plate so that said carrier may rotate with relation to said actuating plate means whereby said rack segment rotates in engagement with said pinion and said cam forces said frictional engagement means outwardly from said cam to frictionally engage said inner housing surface to rotate said housing with said shaft.

6. In a clutch, the combination of, a shaft, a housing assembly including an inner annular surface driving plate, a pressure plate within said housing and around said shaft and adapted to slide axially with relation to said shaft and housing, actuating plate means around said shaft and including a hub having pinion teeth thereon, a shoe carrier member keyed to said shaft, pin means in said carrier and extending parallel to the axis of said shaft, arm means comprising rack segment means to mesh with said pinion teeth and including cam means through which said pin means passes, frictional engagement means mounted on said carrier and adapted to move with relation thereto, and an actuator means adapted to move said pressure plate axially of said shaft and into frictional contact with said actuating plate means to force said actuating plate means against said driving plate so that said carrier may rotate with relation to said actuating plate means whereby said rack segment rotates in engagement with said pinion and said cam forces said frictional engagement means outwardly from said cam to frictionally engage said inner housing surface to rotate said housing with said shaft, said actuator means including means adjustably mounting the actuator means in the housing assembly for wear compensating resetting as wear occurs between said pressure plate and said actuating plate means and said driving plate.

LESLIE D. STRIPLING.

References Cited in the file of this patent

UNITED STATES PATENTS

| Number | Name | Date |
|---|---|---|
| 1,925,897 | Fawick | Sept. 5, 1933 |
| 2,123,867 | Criley | July 19, 1938 |

FOREIGN PATENTS

| Number | Country | Date |
|---|---|---|
| 282,029 | Great Britain | Nov. 14, 1927 |
| 342,446 | Great Britain | Feb. 5, 1931 |
| 619,046 | Great Britain | Mar. 3, 1949 |